(12) United States Patent
Dupre

(10) Patent No.: US 11,597,450 B1
(45) Date of Patent: Mar. 7, 2023

(54) TRUCK BED ACCESS SYSTEM AND METHOD OF USE

(71) Applicant: James C. Dupre, Weatherford, TX (US)

(72) Inventor: James C. Dupre, Weatherford, TX (US)

( * ) Notice: Subject to any disclaimer, the term of this patent is extended or adjusted under 35 U.S.C. 154(b) by 0 days.

(21) Appl. No.: 16/516,729

(22) Filed: Jul. 19, 2019

Related U.S. Application Data

(60) Provisional application No. 62/700,635, filed on Jul. 19, 2018.

(51) Int. Cl.
 *B62D 33/02* (2006.01)
 *B62D 33/027* (2006.01)
 *B62D 25/18* (2006.01)
 *B62D 25/02* (2006.01)

(52) U.S. Cl.
 CPC ........... *B62D 33/027* (2013.01); *B62D 25/02* (2013.01); *B62D 25/18* (2013.01)

(58) Field of Classification Search
 CPC .......................... B62D 33/0276; B62D 33/027
 USPC ............................... 296/183.1, 186.4, 52, 50
 See application file for complete search history.

(56) References Cited

U.S. PATENT DOCUMENTS

| | | | | |
|---|---|---|---|---|
| 4,724,585 A | * | 2/1988 | Whitman | F16B 5/0635 280/848 |
| 5,615,922 A | * | 4/1997 | Blanchard | B60R 9/02 224/404 |
| 6,030,018 A | * | 2/2000 | Clare | B60J 10/24 224/404 |
| 8,857,880 B2 | * | 10/2014 | Kalergis | B62D 33/027 224/543 |
| 2003/0227188 A1 | * | 12/2003 | De Gaillard | B62D 25/105 296/50 |
| 2005/0052045 A1 | * | 3/2005 | Juzwiak | B60R 9/02 296/37.6 |

* cited by examiner

*Primary Examiner* — Joseph D. Pape
(74) *Attorney, Agent, or Firm* — Leavitt Eldredge Law Firm

(57) ABSTRACT

A truck system includes a truck bed having a first side, a second side, and a back end; a first panel slidingly engaged with the first side; and one or more rails to facilitate the sliding engagement of the first panel with the first side; the first side is positioned above a first wheel; and sliding the first panel from a first position to a second position provides access to an interior of the bed.

4 Claims, 5 Drawing Sheets

TRUCK BED ACCESS SYSTEM AND METHOD OF USE

BACKGROUND

1. Field of the Invention

The present invention relates generally to truck systems, and more specifically, to a truck system with removable side panels of the bed, thereby providing a convenient means to access the truck bed.

2. Description of Related Art

Truck systems are well known in the art and are effective means to haul items. For example, FIG. 1 depicts a conventional truck system 101 having a bed 103 in which the user places one or more items for transport. During use, the user must lift the items over the side of the truck bed, or alternatively lower the tailgate and insert the items.

One of the problems commonly associated with system 101 is limited use. For example, it can be difficult to get some items into the bed via the tailgate or over the top of the side of the bed.

Accordingly, although great strides have been made in the area of truck systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
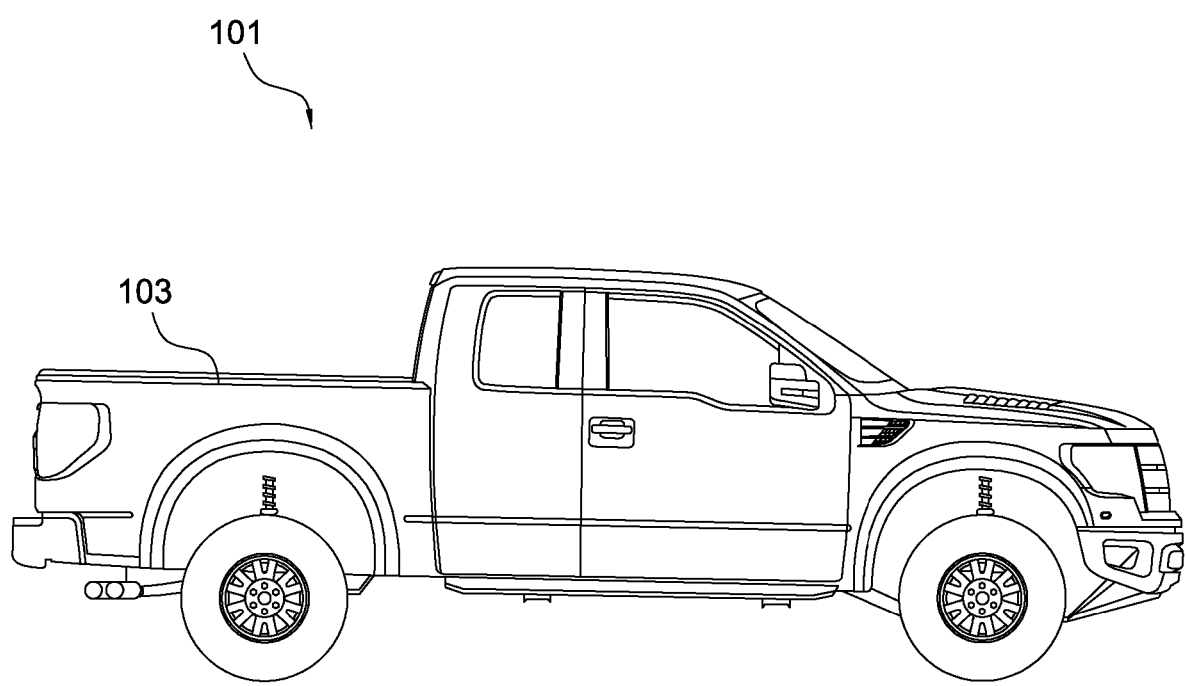
FIG. 1 is a side view of a conventional truck system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional truck systems. Specifically, the present invention provides for a sliding side panel to allow access to an interior of the bed of a truck. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
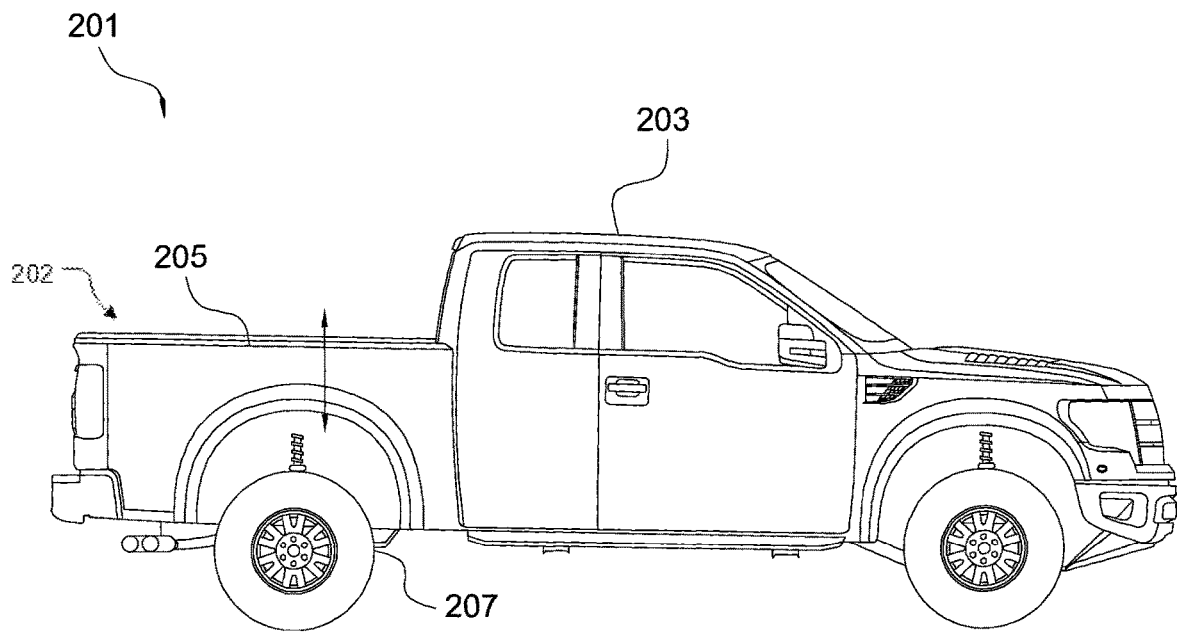
FIGS. 2A and 2B are side views of a truck system in accordance with a preferred embodiment of the present application.
Figure 2B:
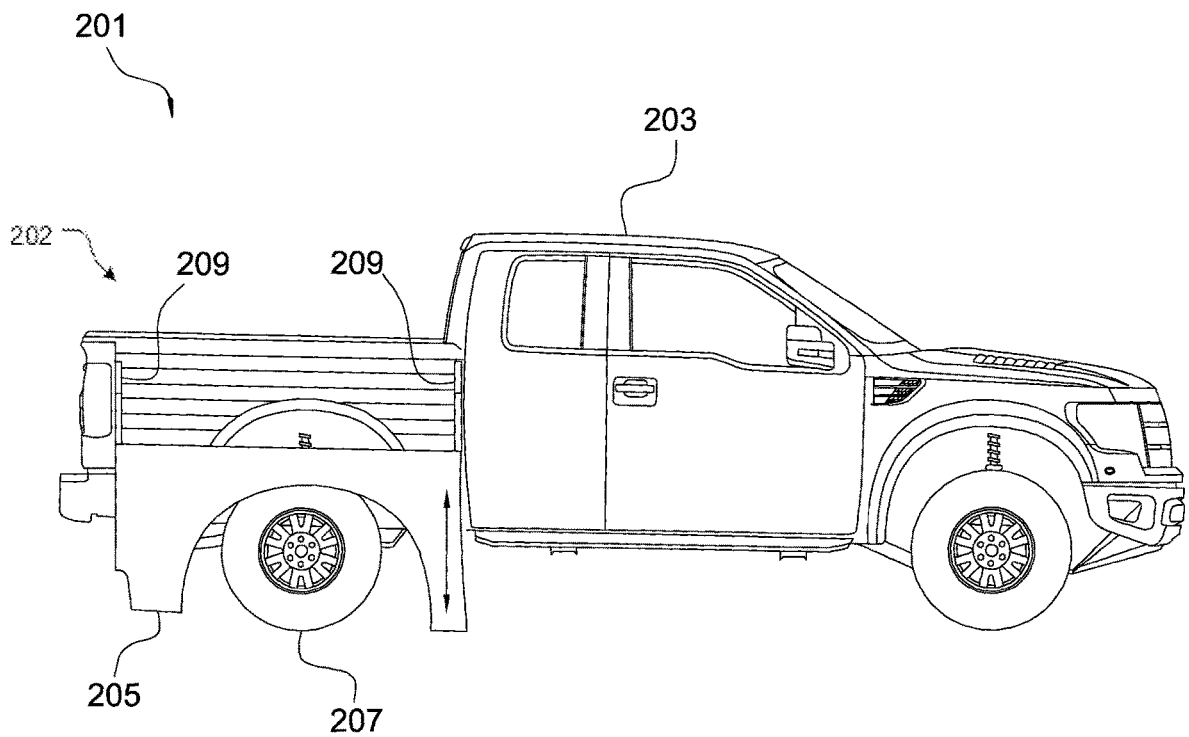

Referring now to the drawings wherein like reference characters identify corresponding or similar elements throughout the several views, FIGS. 2A and 2B depict side views of a truck system 201 in accordance with a preferred embodiment of the present application. It will be appreciated that system 201 overcomes one or more of the above-listed problems commonly associated with conventional truck systems.

In the contemplated embodiment, system 201 includes a truck 203 having a bed 202 with a first side, second side, and a back end. System 201 further includes a first panel 205 configured to slidingly engage with one or more rails 209 on the first side, thereby providing a means for the panel to slide up and/or down to provide access to the interior of the bed 202. As shown, the first panel can have a cut out to fit over a wheel 207, and can vary in sizes as necessary for various truck models. Further, it should be appreciated that additional features, such as stops, locks, and the like can be implemented with rails 209 to secure the panel 205 in an open or closed position.

Figure 3A:
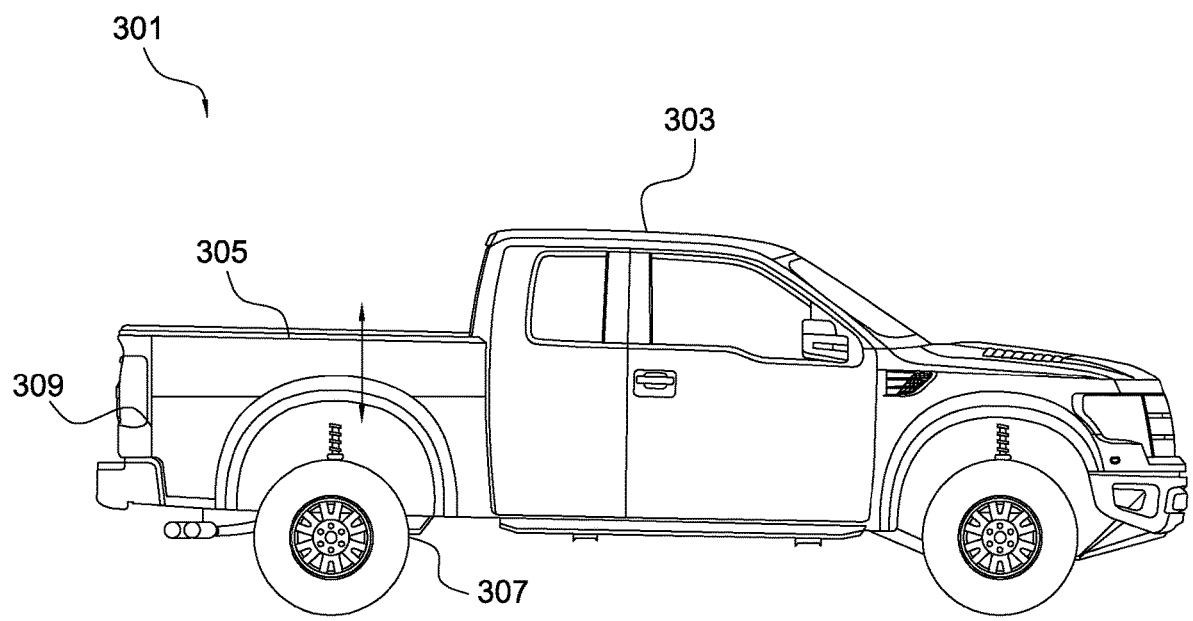
FIGS. 3A and 3B are side views of a truck system in accordance with an alternative embodiment of the present application.
Figure 3B:
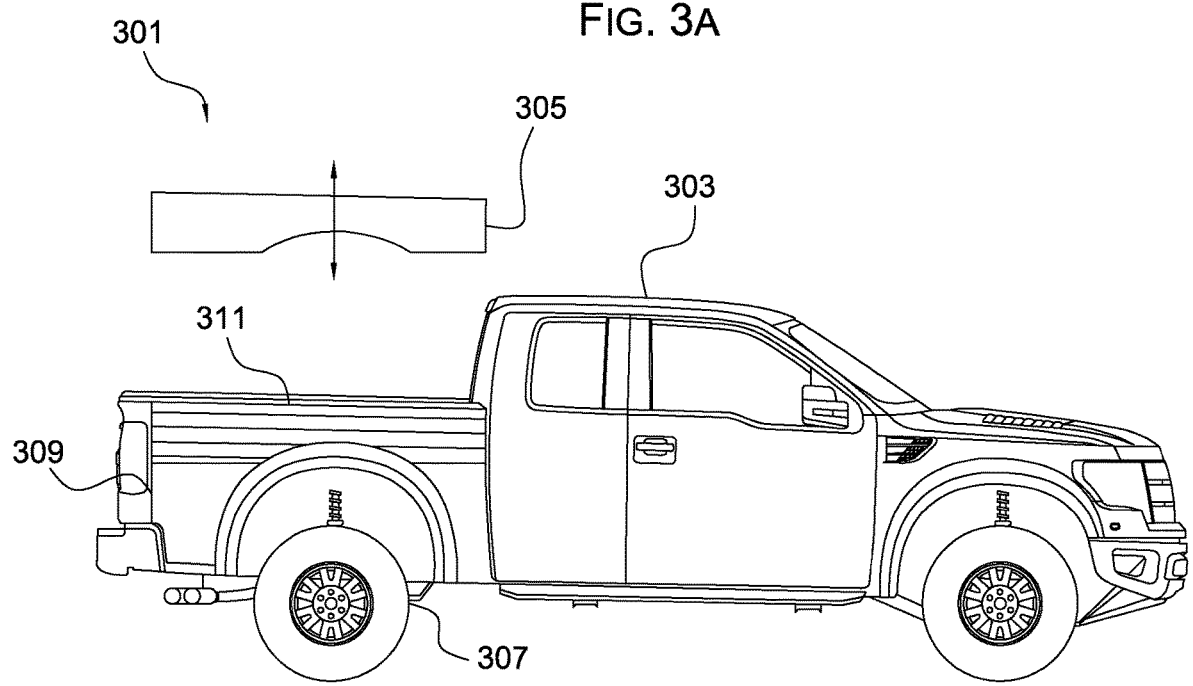

In FIGS. 3A and 3B, side views depict an alternative embodiment of a truck system 301 having a truck bed 302 extending from a truck 303 and having a first side, second side, and back end. In this embodiment, a side panel is composed of a first section 305 and a second section 309 and positioned above a wheel 307, wherein the first section 305 is configured to slide relative to the side, and thereby provide access to an interior of the bed. It should be appreciated that section 305 can be fully removed, thereby providing additional access to the interior of the bed.

It should be appreciated that embodiments 201 and 301 can be interchanged, thereby providing a truck having a sliding panel that is only a partial panel, such as shown in FIG. 3. And further, an embodiment, wherein a full panel is removable from the side of the truck.

It should be appreciated that one of the unique features believed characteristic of the present application is the ability of a panel to slide relative to the bed of the truck, thereby providing a means for improved access to the interior of the bed.

Figure 4A:
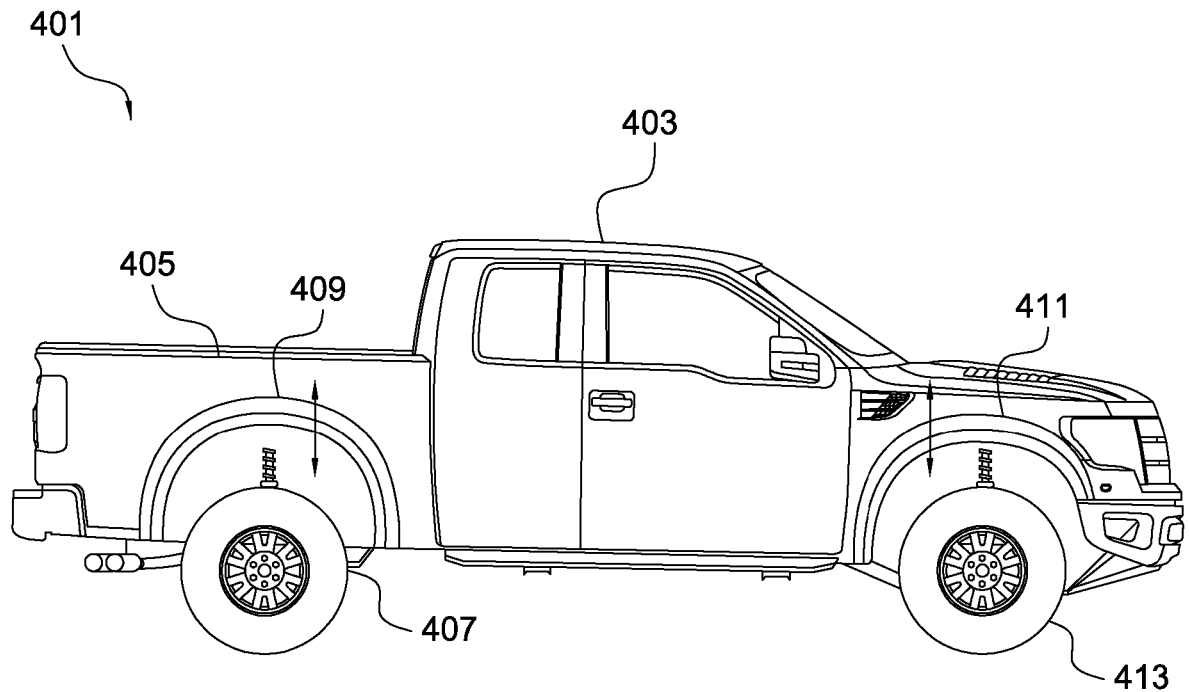
FIGS. 4A and 4B are side views of either of the truck systems of FIGS. 2 and 3, with an additional feature of removable wheel well covers in accordance with the present application.
Figure 4B:
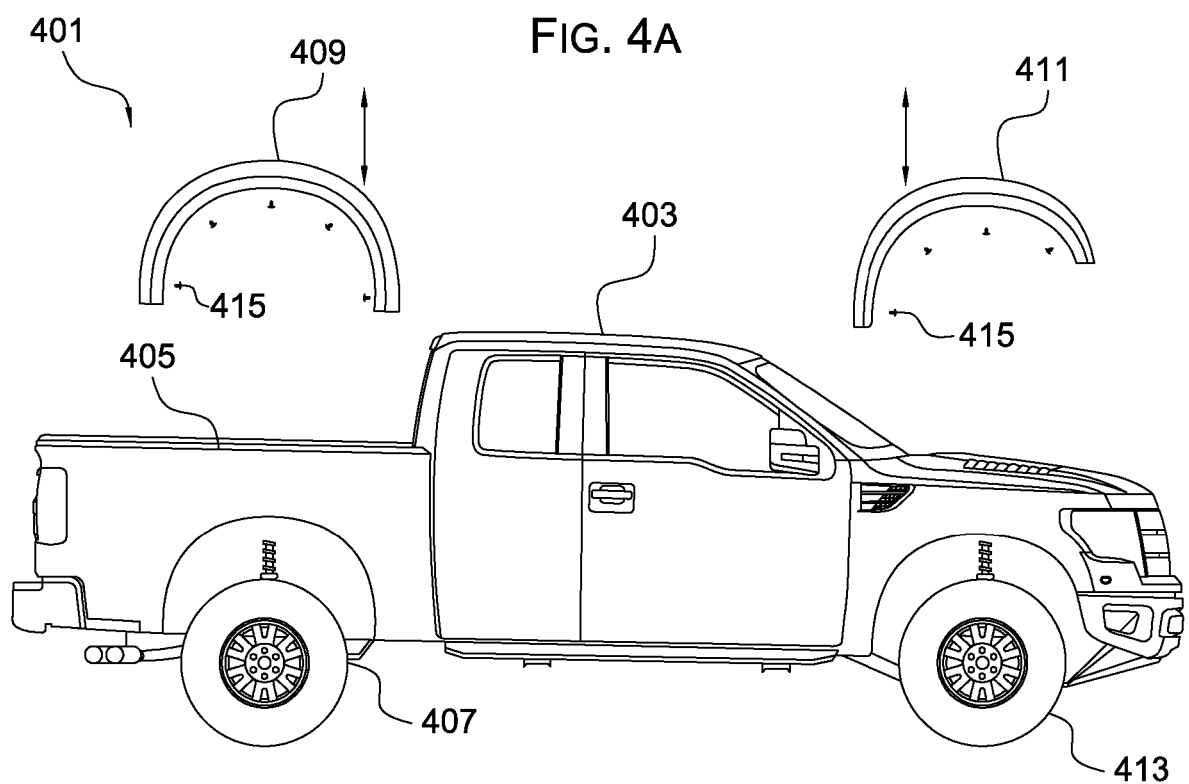

In FIGS. 4A and 4B, side views depict a truck system 401 which can have all of the features discussed above, including a truck 403 with a bed 405 and any of the panel configurations discussed above. In this embodiment, system 401 further includes removable wheel wells 409, 411 configured to engage with truck 403 via one or more clips, screws, bolts, or other attachment means 415 and cover wheels 407, 413. It should be appreciated that the wheel wells can be on the exterior or interior of the bed 405.

Figure 5A:
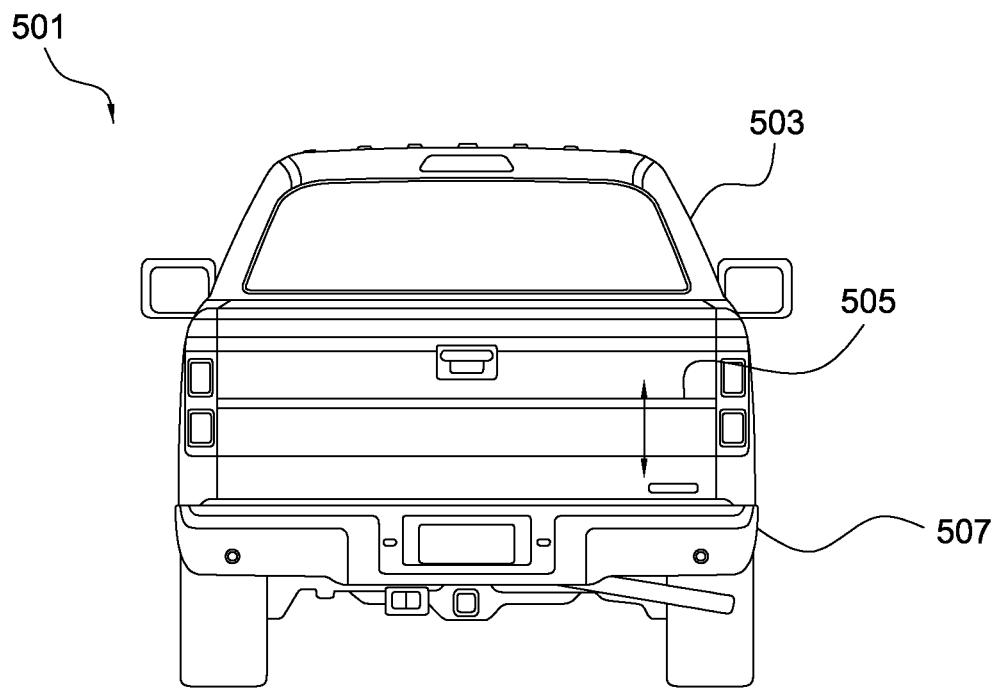
FIGS. 5A and 5B are rear views of either of the truck systems of FIGS. 2 and 3 with a vertically sliding tailgate in accordance with the present application.
Figure 5B:
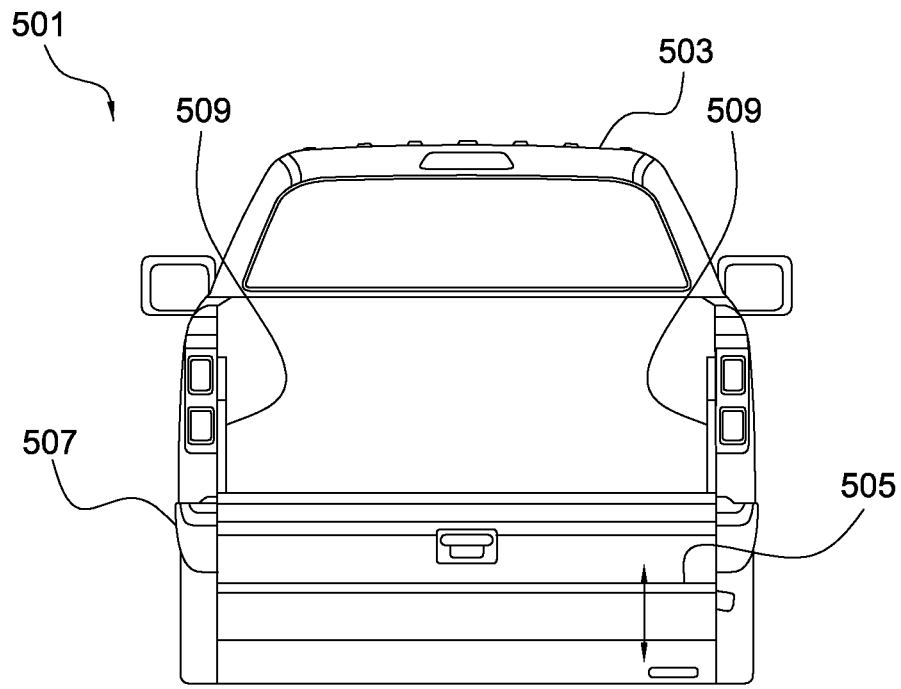

In FIGS. 5A and 5B, back end views depicts another feature contemplated for including with either system 201 or 301, wherein a truck system 501 includes a truck 503 with a tailgate 505 configured to slidingly traverse relative to the back end 507 of the truck. In this embodiment, one or more rails 509 can be positioned to allow the tailgate to slide up and/or down to provide access to the interior of the bed.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A truck system, the truck system having:
   a truck bed having a first side, a second side, and a back end;
   a first panel slidingly engaged with the first side; and
   one or more rails configured to facilitate the sliding engagement of the first panel with the first side, the one or more rails are fixedly secured to the first side and slidingly engaged with the first panel;
   wherein the first side is positioned above a first wheel; and
   wherein sliding the first panel from a first position to a second position provides access to an interior of the bed, the first position covering the access to the bed, while the second position provides access to the interior of the bed while the first panel is in a raised position.

2. The truck system of claim 1, wherein the first panel is removable by sliding the first panel upwards to release the first panel from the one or more rails.

3. The truck system of claim 1, further comprising:
   a removable wheel well configured to secure to the truck via one or more clips.

4. The truck system of claim 1, further comprising
   a tailgate;
   one or more rails positioned at the back end of the truck;
   wherein the tailgate is configured to vertically slide via the one or more rails to provide access to the interior of the bed.

* * * * *